May 23, 1961  S. W. TINSLEY ET AL  2,985,667
EXO-DICYCLOPENTADIENE DIOXIDE
Filed Oct. 30, 1958

INVENTORS
SAMUEL W. TINSLEY
PAUL S. STARCHER
BY Donal E. McCarthy
ATTORNEY

United States Patent Office 2,985,667
Patented May 23, 1961

2,985,667
EXO-DICYCLOPENTADIENE DIOXIDE

Samuel W. Tinsley, South Charleston, and Paul S. Starcher, Charleston, W. Va., assignors to Union Carbide Corporation, a corporation of New York Filed Oct. 30, 1958, Ser. No. 770,814

1 Claim. (Cl. 260—348)

The present invention relates to a novel isomer, exo-dicyclopentadiene dioxide, which can be employed effectively as a nematocide and soil fungicide to destroy nematodes and soil fungus without deleterious effects upon germinating seeds such as rye, millet, amaranthus and mustard.

Exo-dicyclopentadiene dioxide can be conveniently represented and characterized by the following stereochemical structure and physical properties:

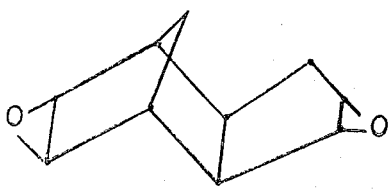

EXO-DICYCLOPENTADIENE DIOXIDE

Physical state=colorless liquid which crystallizes on standing
Boiling point=119–121° C./4 mm. Hg
Melting point=39–42° C. (of crystals)
Refractive Index $(n\ 30/D)=1.5170$–$1.5173$ (of supercooled liquid)
Elemental Analysis:

|  | Calculated for $C_{10}H_{12}O_2$ | Found |
|---|---|---|
| Carbon | 73.20 | 73.26 |
| Hydrogen | 7.32 | 7.8 |

Dicyclopentadiene dioxide, as known in the literature is actually endo-dicyclopentadiene dioxide and is characterized by the following stereochemical structure and physical properties:

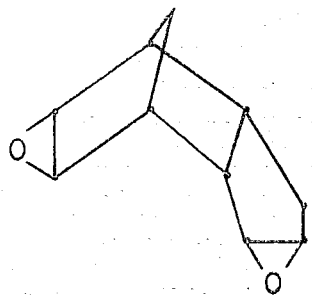

ENDO-DICYCLOPENTADIENE DIOXIDE

Physical state=solid
Melting point:
   (Observed)=185–189° C.
   (Literature)=189° C.

Figure 1:
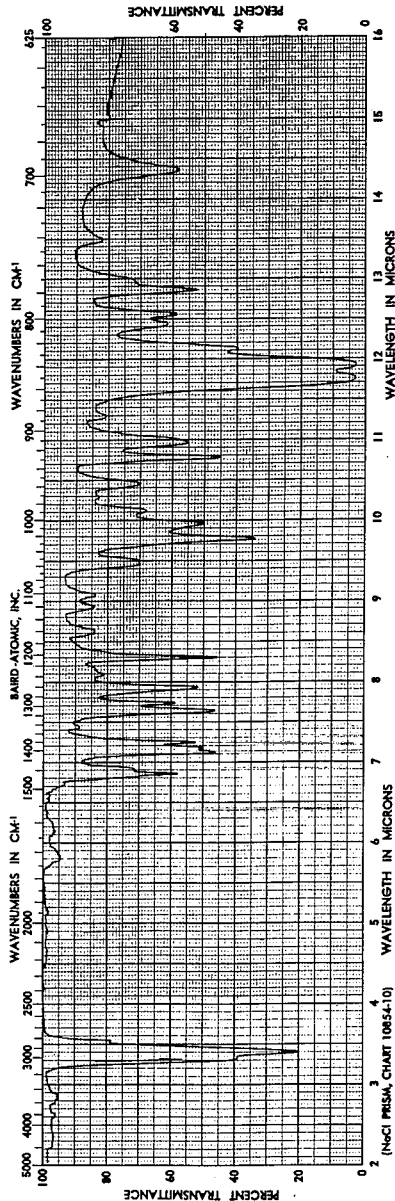

The infrared absorption spectrum of exo-dicyclopentadiene dioxide is as shown in Figure 1. The characteristic infrared absorption bands for exo-dicyclopentadiene dioxide, in microns, is as follows:

EXO-DICYCLOPENTADIENE DIOXIDE
[Wave length of absorption peaks in microns]

| | | | |
|---|---|---|---|
| 3.35 (sh) | 7.64 (m) | 9.76 (s) | 11.9 (vs) |
| 3.4 (s) | 7.78 (m) | 9.95 (m) | 12.13 (sh) |
| 3.54 (sh) | 7.93 (m) | 10.12 (w) | 12.43 (w) |
| 6.75 (m) | 8.1 (w) | 10.3 (vw) | 12.55 (w) |
| 6.9 (sh) | 8.3 (m) | 10.45 (w) | 12.85 (m) |
| 7.12 (m) | 8.62 (w) | 10.77 (m) | 12.95 (sh) |
| 7.17 (sh) | 8.92 (w) | 10.95 (m) | 13.5 (w) |
| 7.25 (m) | 9.07 (w) | 11.3 (w) | 14.35 (m) |
| 7.43 (w) | 9.5 (w) | 11.75 (vs) | | wherein the symbols (sh), (s), (m), (w), (vs) and (vw) signify a shoulder, strong, medium, weak, very strong and very weak absorption band, respectively.

Figure 2:
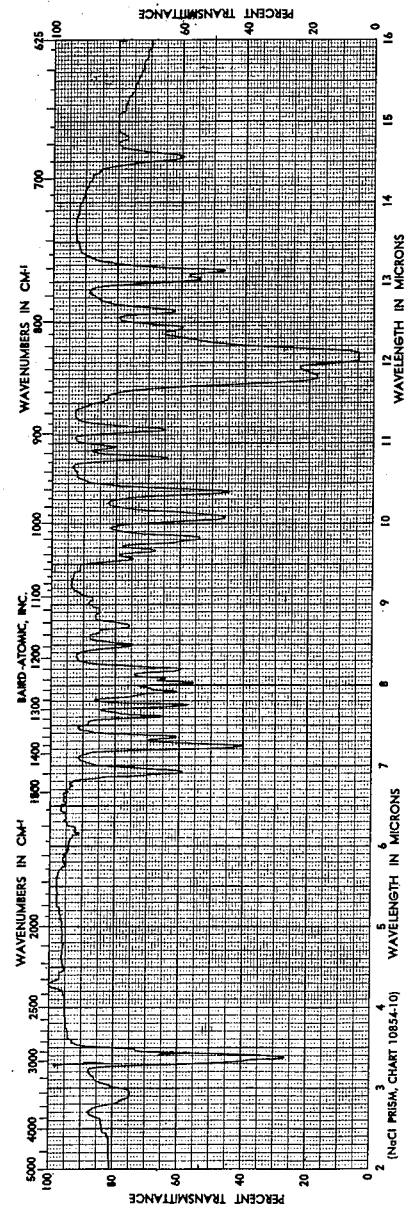

The infrared absorption spectrum of endo-dicyclopentadiene dioxide is as shown in Figure 2. The characteristic absorption bands for endo-dicyclopentadiene dioxide, in microns, is as follows:

ENDO-DICYCLOPENTADIENE DIOXIDE
[Wave length of absorption peaks in microns]

| | | | |
|---|---|---|---|
| 3.35 (sh) | 7.95 (sh) | 9.56 (w) | 11.82 (s) |
| 3.38 (s) | 8.03 (m) | 9.65 (w) | 11.93 (w) |
| 3.46 (sh) | 8.07 (sh) | 9.82 (m) | 12.06 (vs) |
| 6.9 (m) | 8.2 (m) | 10.07 (m) | 12.63 (m) |
| 7.25 (m) | 8.5 (w) | 10.4 (m) | 13.03 (m) |
| 7.35 (w) | 8.65 (sh) | 10.8 (m) | 13.13 (m) |
| 7.6 (m) | 8.73 (w) | 10.95 (w) | 14.55 (m) |
| 7.75 (m) | 8.92 (w) | 11.15 (m) | 14.8 (w) |
| 7.92 (m) | 9.06 (w) | 11.55 (sh) | | wherein the symbols in parentheses are as above defined.

In the determination of the infrared spectra of exo- and endo-dicyclopentadiene dioxide, the infrared spectrometer used was a Baird Atomic Infrared Spectrophotometer Model 4-55 equipped with a sodium chloride prism at normal slit width under normal running conditions. The reference beam energy was set to 100 percent at 5.0 microns wave length and the scanning speed was 12 minutes for the range of 2–16 microns.

The sample of exo-dicyclopentadiene dioxide, since it is a liquid, is prepared by providing a capillary film between standard sodium chloride plates. In the case of endo-dicyclopentadiene dioxide, a solid, a sample was prepared by mixing one weight percent of the solid with potassium bromide and pressing into a pellet using a standard Baird die and the recommended potassium bromide pellet technique to provide a clear plaque 0.031 inch in thickness.

As previously pointed out, exo-dicyclopentadiene dioxide is adapted for use as a soil fungicide and nematocide without harmful results to germinating plants. This unusual characteristic is of particular use since solutions containing the same can be sprayed on soil to selectively eliminate nematodes therefrom without complete poisoning the soil so that germinating plants cannot thrive. Endo-dicyclopentadiene dioxide, however, when applied to the soil, completely poisons the soil, making it useless for the growing of plants.

The following tabular data vividly illustrates the nematocidal and soil fungicidal activity of exo-dicyclopentadiene dioxide as compared with endo-dicyclopentadiene dioxide:

Table I

| Test Isomer | Fungi Soil Pyth. | | Nematodes Soil | |
|---|---|---|---|---|
| | H | L | H | L |
| Exo | 2 | 1 | 2 | 1 |

Table II
SEED GERMINATION

| Test Isomer | Soil | | | | | | | |
|---|---|---|---|---|---|---|---|---|
| | Rye | | Millet | | Amar. | | Must. | |
| | H | L | H | L | H | L | H | L |
| Exo | 1 | 1 | 1 | 1 | 1 | 1 | 1 | 1 |
| Endo | 4 | 4 | 4 | — | 4 | — | 4 | — |

The results set forth in Tables I and II were obtained by subjecting the exo and endo isomers of dicyclopentadiene dioxide to identical tests as follows:

*Soil fungicide test.*—The test compounds are formulated by preparing a test solution comprising the test compound, acetone and an emulsifier and diluting with water such that the rates are equivalent to 75 lbs./acre and 150 lbs./acre (the symbols H and L are employed in Tables I and II to indicate the rates expressed in the various tests). Thereupon, 75 ml. of the test solution of the compound are drenched on to each of two 4-inch clay pots containing infested soil artificially inoculated with Pythium, the organism for the test. The treated pots are covered with aluminum foil to prevent drying of the soil and incubated for two days at room temperature. Following the incubation period, the pots are each seeded with 15 peas as an indicator crop and placed in a greenhouse. About 15 days after planting, a count is made of the number of seedlings per pot which have germinated. The average percent germination is calculated and the results are reported according to the following rating designations:

5 = 90–100% germination
4 = 70–89% germination
3 = 50–69% germination
2 = 25–49% germination
1 = 0–24% germination

*Nematocide test.*—The test compounds are formulated as set forth above in the Soil Fungicide Test and 25 ml. of the test solution containing 50 mg. and 10 mg. of test compound per jar is added to each of two jars previously prepared and containing 180 cc. of composted loam soil infected with a small amount of inoculum derived from finely chopped roots of Rutgers variety tomato plants infected with the migratory larvae of the rootknot nematode (*meloidogyne incognita* var. *acrita*) which have been incubated for one week at room temperature so that eggs of the nematode hatch and the larval forms migrate into the soil.

After the test solutions have been added to the jars, they are capped at room temperature for 48 hours and then transferred to 3-inch pots and seeded with cucumber seeds as an indicator crop and placed in a greenhouse for about three weeks.

Thereafter, the plants are removed from the pots, the soil is washed from the roots and the amount of galling visually rated according to the following designations:

1 = severe galling
2 = moderate galling
3 = light galling
4 = very light galling
5 = no galling; perfect control

*Primary seed germination test (soil).*—In this test, the following seeds are employed:

Perennial rye grass—*Solium perenne*
Golden Miller—*Setaria italica* var. *stramineofructa*
Red Root—*Amaranthus retroflexus*
Mustard—*Brassica pincea* var. *foliosa*.

Test solutions are prepared as above containing the test compounds at concentrations of 1000 and 100 p.p.m. respectively.

Two seed-soil mixtures are prepared as follows:

Mixture I:
  53 cc. rye grass seed.
  27 cc. mustard seed
  6100 cc. sifted, fairly dry soil Mixture II:
  31 cc. millet seed
  12 cc. Amaranthus
  6100 cc. sifted, fairly dry soil.

Each of the above mixtures is rolled separately in 2 gallon containers for approximately ½ hour on a ball mill to insure mixing of seeds and soil. The volume of each mixture is sufficient for testing 40 compounds at two concentrations plus 4 untreated controls (84 pots).

One hundred sixty-eight, 3-inch pots are filled with soil to within 1½ inch of top of pots. To 84 of these pots is added 70 cc. of Mixture I. Seventy cc. of Mixture II is added to the remaining 84 pots. The seed-soil mixture is tamped firmly, the pots are removed to greenhouse and watered lightly.

About 2 hours after planting, 25 ml. of the test solution is added to each of two pots for each soil-seed mixture; i.e., one replicate of each seed mixture per concentration. An equal volume of a water solution containing acetone and an emulsifier in the same concentration as the herbicidal mixture but without the candidate herbicide is also added to each of the soil-seed mixtures. These pots are used as check or control units.

Three weeks after application of the test solution, injury is noted for each species by comparing treated and untreated pots. Ratings are made according to the following designations:

5 = No seedlings emerged
4 = Few seedlings emerged and/or very severe stunting (severe reduction in germinated plants)
3 = Moderate reduction in stand and/or moderate stunting
2 = Very slight reduction in stand and/or slight stunting
1 = No injury; seedlings appear no different with respect to stand or growth than untreated controls.

The exo isomer of dicyclopentadiene dioxide is conveniently manufactured by reacting the endo isomer of dicyclopentadiene with hydrogen iodide to produce the exo hydroiodide of dicyclopentadiene. Subsequently, the exo hydroiodide product is reacted with an alkali hydroxide to generate the exo isomer of dicyclopentadiene.

The exo isomer of dicyclopentadiene is thereafter reacted with an epoxidant such as peracetic acid in an amount sufficient to epoxidize both double bonds to produce the exo isomer of dicyclopentadiene dioxide.

The following examples will serve to illustrate the practice of the invention:

EXAMPLE 1

*Preparation of exo-dicyclopentadiene*

A mixture of 550 grams of endo-dicyclopentadiene and 1135 grams of 47 percent aqueous hydroiodic acid was heated with agitation to 100° C. for a period of six hours. The layers were separated and the oil layer was distilled to yield 761 grams of iodo-dihydro-exo-dicyclopentadiene (74 percent yield) having a boiling range of 120–136° C. at 10 mm. pressure. The iodo compound was added to a solution of 392 grams of potassium hydroxide in 1570 ml. of 95 percent ethanol and heated under reflux (90° C.) for a period of 23 hours. The reaction mixture was diluted with 600 ml. of water to dissolve the precipitated salt. The layers were separated, the water layer was extracted with ether and the combined oil layers distilled to remove ethanol and ether. The kettle material was diluted with 250 ml. of water, agitated, and the layers were separated. The organic layer was fractionated under reduced pressure to yield 126 grams (33 percent of the theoretical) of exo-dicyclopentadiene boiling at 56° C. at 12 mm. pressure and having a refractive index of 1.5050 ($n_D^{30}$). This diolefin would not freeze at —75° C. Bartlett (J. Am. Chem. Soc. 69, 2553 (1947)) reported a boiling point of 51–53° C. at 12 mm. and a refractive index of 1.5070 ($n_D^{25}$). There was also obtained a quantity of hydroxydihydro-exo-dicyclopentadiene in the higher boiling fraction.

EXAMPLE 2

*Preparation of exo-dicyclopentadiene dioxide*

To 178 grams of exo-dicyclopentadiene, prepared as described in Example 1, was added 882 grams of a 27.9 percent solution of peracetic acid in ethyl acetate over a period of approximately two hours at 40° C. After an additional three-hour period at 40° C., an analysis for peracetic acid showed that the theoretical amount of peracid had been consumed. The reaction mixture was co-distilled with ethylbenzene to remove ethyl acetate and acetic acid. Fractionation of the crude residue product through a 15-inch by 22 mm. distillation column gave 165 grams (75 percent yield) of exo-dicyclopentadiene dioxide having the following properties:

Appearance _____ Colorless liquid which crystallizes on standing to a white solid.
Melting point _____ 39–42° C. (of crystals).
Boiling point _____ 119–121° C. at 4 mm. Hg.
Refractive index ($n_D^{30}$) ___ 1.5170–1.5173.

ELEMENTAL ANALYSIS

Percent carbon:
 Calculated for $C_{10}H_{12}O_2$=73.20. Found=73.26.
Percent hydrogen:
 Calculated for $C_{10}H_{12}O_2$=7.36. Found=7.8.
Infrared spectrum:
 Shows bands characteristic of cis epoxides at 11.75 and 11.90 $\mu$. Practically no absorption at 2.85 $\mu$ and 5.80 $\mu$ which are characteristic of OH groups and carbonyl groups respectively and which might be expected if the epoxide groups had reacted with the by-product acetic acid. There is also no absorption in the 6.2 $\mu$ region which would indicate residual unsaturation.

What is claimed is:
Exo-dicyclopentadiene dioxide.

References Cited in the file of this patent

Wieland et al.: Annalen der Chemie, vol. 446 (1926), page 29.

Bauer et al.: J. Praktische Chemie, vol. 122 (1929), pages 209–11.